United States Patent [19]

Okamura et al.

[11] 4,438,860
[45] Mar. 27, 1984

[54] MAGNETIC TAPE CASSETTE

[75] Inventors: Masatoshi Okamura; Haruo Shiba, both of Tokyo, Japan

[73] Assignee: TDK Electronics Co., Ltd., Tokyo, Japan

[21] Appl. No.: 323,024

[22] Filed: Nov. 19, 1981

[30] Foreign Application Priority Data

Feb. 9, 1981 [JP] Japan .................. 56-16865[U]

[51] Int. Cl.³ .............. G11B 23/06; B65H 7/48; B65D 6/34; B65D 1/46
[52] U.S. Cl. .................. 220/4 B; 220/72; 242/55.19 A; 242/197; 264/328.12
[58] Field of Search .............. 220/4 B, 4 E, 72, 74, 220/70; 206/387, 444; 242/55.19 A, 197; 264/328.12

[56] References Cited

U.S. PATENT DOCUMENTS 4,227,622 10/1980 Okamara .................. 220/4 B

FOREIGN PATENT DOCUMENTS 948280 1/1964 United Kingdom .................. 220/72

Primary Examiner—George E. Lowrance
Attorney, Agent, or Firm—Oblon, Fisher, Spivak, McClelland & Maier

[57] ABSTRACT

A magnetic tape cassette has an outer peripheral rib for partitioning a part of a bottom plate, said rib being formed near the head receiving portion of an upper half casing wherein the inside portion of said bottom plate defined by said outer peripheral rib is tapered to have the thickness of said outer peripheral rib at the connecting point of said bottom plate to said outer peripheral rib.

3 Claims, 4 Drawing Figures

MAGNETIC TAPE CASSETTE

BACKGROUND OF THE INVENTION

1. Field of the Invention

The present invention relates to a magnetic tape cassette for the VHS system used mainly in a VHS type magnetic tape recorder.

2. Description of the Prior Art

FIGS. 1-3 illustrates the conventional magnetic tape cassette wherein reels (4), (5) for winding a magnetic tape (3) are held inside the casing assembly formed by an upper half casing (1) and a lower half casing (2). Tape guides (6), (7) and (8) for guiding the magnetic tape (3) and a tape pad (9) is provided in the running passage of the magnetic tape between the reels (4), (5) in the front of the casing assembly so that the magnetic tape (3) runs between the reels (4), (5) while it is successively brought into contact with these parts (6) to (9). The front portion of the casing assembly as a running area for the magnetic tape (3) is covered by a guard panel (10) which is pivotally supported by the upper half casing so as to be capable of opening and closing.

When the magnetic tape cassette is put in a video deck, the guard panel (10) is turned upward on the upper half casing (1) so that the running surface for passing the magnetic tape (3) is exposed in front of the casing assembly. Then, a drawing device of the video deck is inserted from the lower half casing side into a head receiving portion (A) formed in the middle of the casing assembly so as to pull out the head, so that recording and reproducing of images can be attained. In the conventional tape cassette, the head receiving portion (A) in the lower half casing (2) is formed by cutting the casing so as to form a channel, whereas the head receiving portion (A) in the upper half casing (1) is formed, as shown in FIG. 2, in such a manner that the projecting plate (13) extending from a bottom plate (12) is formed outside a peripheral rib (11) so as to cover the rotating head.

In the conventional tape cassette, however, the thickness $t_1$ of the projecting plate (13) outside the rib (11) is smaller than the thickness $t_2$ of the bottom plate (12) inside the rib (11) as shown in FIG. 3. Therefore, in the resin molding for the upper half casing (1), fine bubbles remained in the thinner projected plate (13) in a plane form to cause white cloudy pattern and deterioration of the appearance and quality.

SUMMARY OF THE INVENTION

It is an object of the present invention to provide a magnetic tape cassette for the VHS which eliminates the occurrence of a white cloudy pattern produced when a upper half casing is molded.

The foregoing and the other objects of the present invention have been attained by providing a magnetic tape cassette having an outer peripheral rib formed near the head receiving portion of an upper half casing, said rib being a partition for defining a part of the bottom plate wherein the thickness of the inside portion of the bottom plate defined by the outer peripheral rib is gradually reduced to be the thickness of the outer peripheral rib.

BRIEF DESCRIPTION OF DRAWINGS

FIG. 4 (B) is a sectional view taken along any one of the lines $B_1$—$B_1$, $B_2$—$B_2$ and $B_3$—$B_3$ of FIG. 4 (A).

DETAILED DESCRIPTION OF THE PREFERRED EMBODIMENT

Figure 1:
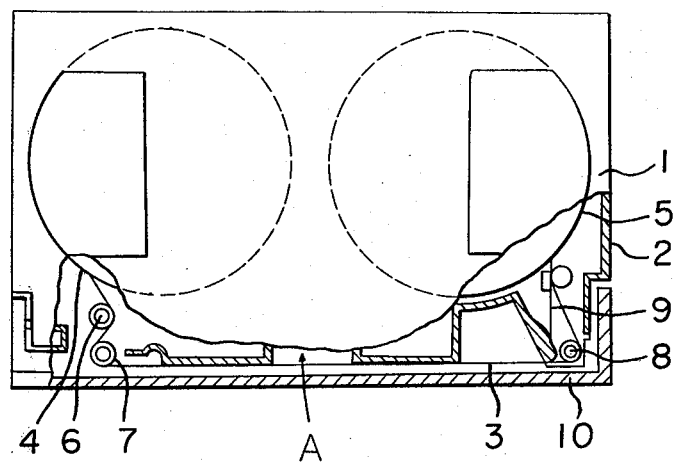
FIG. 1 is a front view, partly sectioned of a typical magnetic tape cassette.
Figure 2:
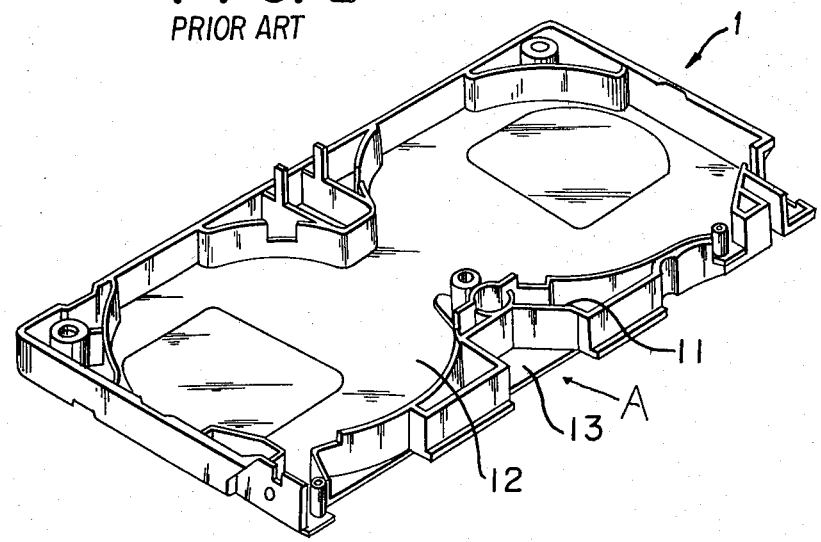
FIG. 2 is a schematic view of the inside of an upper half casing of the magnetic tape cassette.
Figure 3:
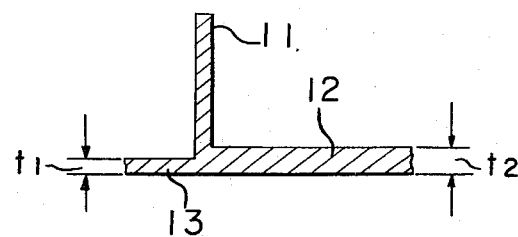
FIG. 3 is a sectional view of the head receiving portion of an upper half casing of the conventional magnetic tape cassette.
Figure 4A:
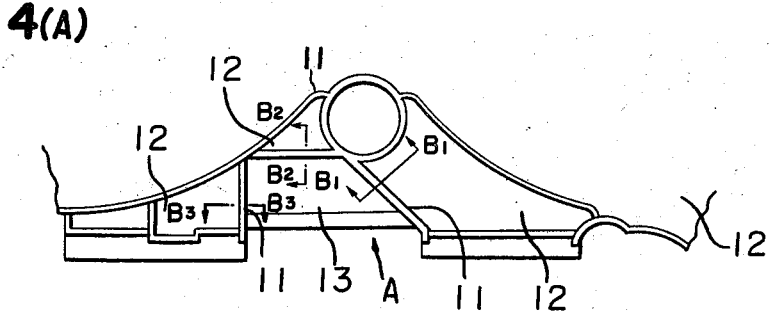
FIG. 4 (A) is an enlarged plan view of the important portion of an upper half casing according to the present invention.
Figure 4B:
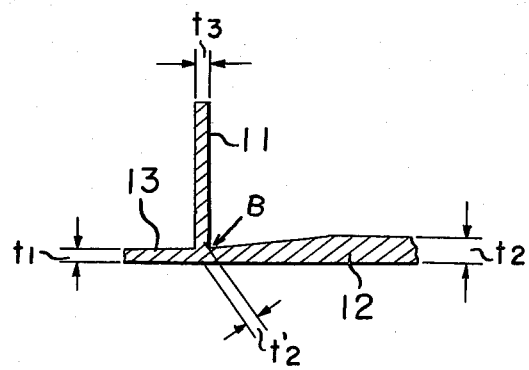

An embodiment of the present invention will be described with reference to drawings. In FIGS. 4 (A) and 4 (B) respectively illustrating an enlarged plan view of the upper half casing of the magnetic tape cassette and a sectional view taken along the lines $B_1$—$B_1$, $B_2$—$B_2$ and $B_3$—$B_3$ of FIG. 4 (A), the thickness $t_2$ of the inside portion of a bottom plate (12) which is defined by an outer peripheral rib (11) from a projecting plate (13) is gradually reduced toward the rib (11) and the thickness $t'_2$ of a root portion (B) of the bottom plate (12) to be connected to the rib (11) (i.e., the distance between the bottom of the bottom plate 12 and interface of the top of the bottom plate (12) and the inside of the outer peripheral rib (11)) is matched to the thickness $t_1$ of the projecting plate (13).

In a preferred embodiment, the ratio of the reduced thickness $(t_2-t'_2)$ to the length (from a point for starting the reduction in thickness to a connecting point) is in the range of 1:6 to 18 wherein the thickness of the projecting plate (13) is the same as that of the rib (11).

In an embodiment of the present invention, when the thickness $t_3$ of the rib (11) is 1.2 mm, the thickness $t_2$ of a flat portion of the bottom plate (12) is 2 mm and the thickness $t_1$ of the projecting plate (13) is 1 mm in the typical upper half casing (1), the thickness $t_2$ of the bottom plate (12) is gradually reduced so that the thickness $t'_2$ of the root portion (B) has a relationship of $t'_2 \approx t_1 = 1$ mm.

In accordance with said structure, it is possible to prevent a trouble of remaining of bubbles only in the projecting plate (13) in the resin molding for the upper casing and to prevent a trouble of formation of white cloudy pattern whereby the appearance and quality are improved.

As described above, a magnetic tape cassette in accordance with the present invention has an outer peripheral rib for partitioning a part of a bottom plate, said rib being formed near the head receiving portion of an upper half casing wherein the thickness of the inside portion of the bottom plate defined by the outer peripheral rib is gradually reduced to be the thickness of the outer peripheral rib. With this structure, a white cloudy pattern caused by the gathering of gas in the bottom plate or the projecting plate outside the outer peripheral rib is prevented thereby providing a magnetic tape cassette for the VHS having excellent appearance and quality.

We claim:

1. A resin molded magnetic tape cassette comprising:
   (a) a bottom plate of an upper half casing;
   (b) a projecting plate which extends outwardly from and is a continuation of said bottom plate; and
   (c) an outer peripheral rib projecting vertically from the juncture between said bottom plate and said projecting plate, said outer peripheral rib being formed near the head receiving portion of said upper half casing, wherein:

(d) said projecting plate has an at least substantially uniform thickness $t_1$;

(e) the central portion of said bottom plate has an at least substantially uniform thickness $t_2$ which is greater than the thickness $t_1$; and (f) the portion of said bottom plate immediately inwardly of said outer peripheral rib tapers from the thickness $t_2$ to the thickness $t_1$ at the point where said outer peripheral rib projects from the juncture between said bottom plate and said projecting plate, whereby a white cloudy pattern in the resin at the juncture between said bottom plate and said projecting plate is substantially avoided.

2. A magnetic tape cassette as recited in claim 1 wherein the surfaces of said bottom plate and said projecting plate on the side opposite from said outer peripheral rib are coplanar.

3. A magnetic tape cassette as recited in claim 1 wherein the ratio of $t_2 - t_1$ to the length of said bottom plate from the point where the taper begins to the point where said outer peripheral rib projects from the juncture between said bottom plate and said projecting plate is in the range of 1:6 to 1:18.

* * * * *